UNITED STATES PATENT OFFICE.

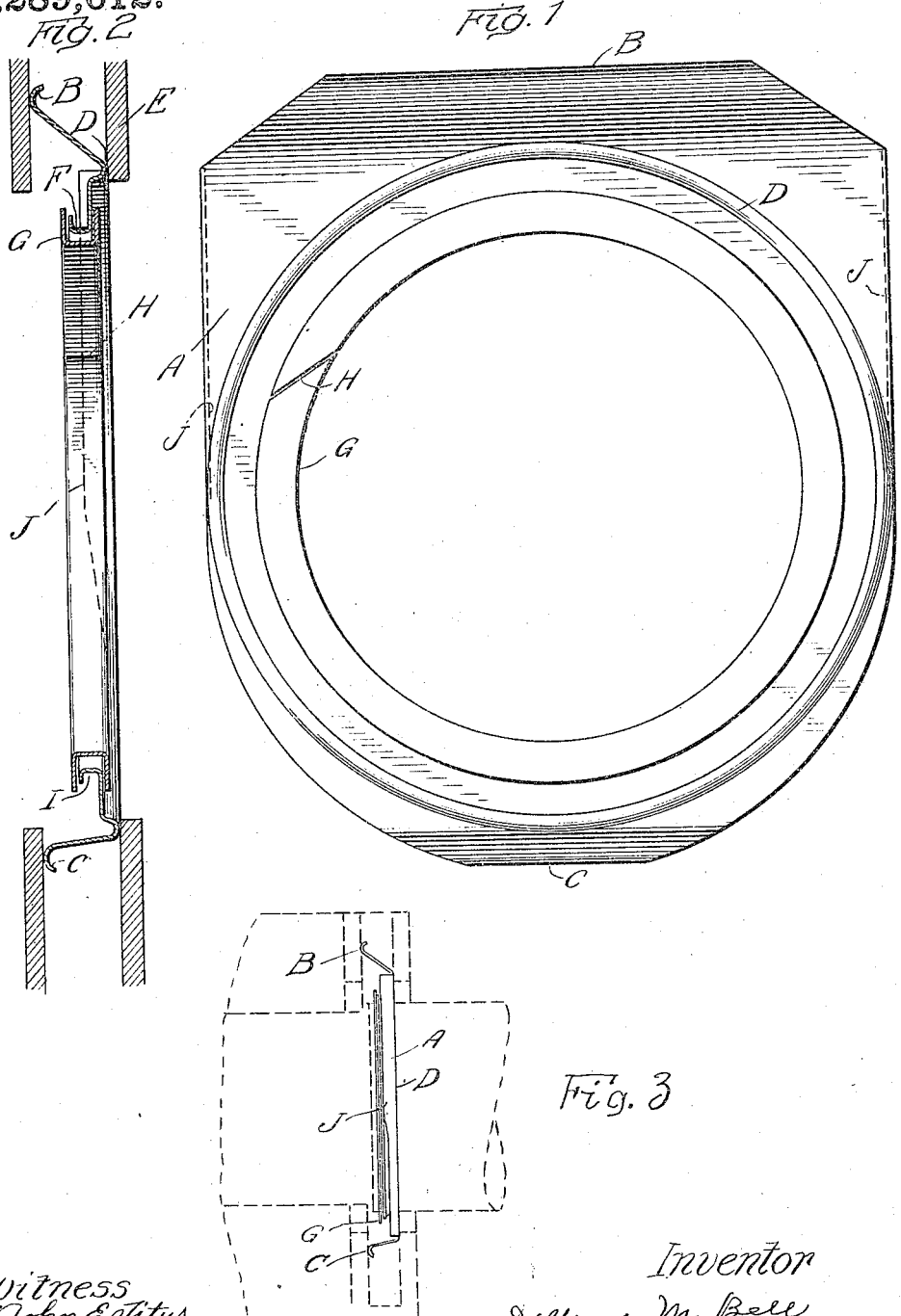

DILLWYN M. BELL, OF OAK PARK, ILLINOIS, ASSIGNOR TO JACOB J. DAUCH, OF SANDUSKY, OHIO.

DUST-GUARD.

1,289,612.

Specification of Letters Patent.

Patented Dec. 31, 1918.

Application filed March 22, 1917. Serial No. 156,729.

*To all whom it may concern:*

Be it known that I, DILLWYN M. BELL, a citizen of the United States of America, residing at Oak Park, in the county of Cook and State of Illinois, have invented certain new and useful Improvements in Dust-Guards, of which the following is a specification, reference being had therein to the accompanying drawing.

The invention relates to dust-guards more particularly designed for use in car axle journal-boxes, and the invention comprises the novel features of construction as hereinafter set forth.

In the drawings, Figure 1 is an elevation of the guard; Fig. 2 is a vertical central cross-section therethrough as arranged in a car axle journal-box; and Fig. 3 is a side elevation on a reduced scale with a bearing box to which the guard is applied shown in dotted lines.

As shown, my improved guard is of that type in which an annular member is secured to the car axle and rotatively engages a stationary plate which is secured in the axle box. To produce an effective dust seal, it is essential that the stationary plate should maintain close contact with the wall of the chamber in the axle box, but as the box is an unmachined casting this wall is not a perfect plane. I have therefore devised a construction of guard in which there is a line contact between the plate and the adjacent wall, which will form a tighter fit than a more extended surface.

Another feature which is essential to the effectiveness of the guard is that the plate should be held in contact with its bearing on the adjacent wall by resilient means, such as a flange extending laterally to the opposite wall. With such a construction there is danger that when the flange is deflected and placed under tension, the whole plate will be sprung out of its plane, which will cause it to bind upon the annular member rotating with the axle. This defect I have avoided by embossing or rimming the plate around the portion engaging the annular axle member, which rib may be also utilized for the line contact forming the dust joint. I have still further guarded against any deflection of the plate by flanging the opposite sides thereof so as to effectually brace and stiffen the same.

In detail, A is a sheet-metal plate of a contour to fit within the axle box, and provided at its upper and lower ends with the obliquely-deflected flanges B and C. The plate is centrally apertured for the passage of the axle and with sufficient clearance to provide for any movement thereof, and surrounding this aperture is an annular rib D forming a substantial line contact bearing on the wall E of the box. Extending inward from the rib D is the portion F for engaging the annular member G which revolves with the car axle. As specifically shown, the member G is U-shaped in cross-section with outwardly extending parallel flanges, and is obliquely split at one point H to permit of contraction for assembly and engagement with the portion F and also to hug the axle. The portion F is provided with a laterally extending flange I fitting within the channel so as to form the dust seal. J are flanges at the opposite sides of the plate A for stiffening the same and preventing warping when under tension.

In use when the guard is engaged with the car axle box and the member G thereof is sleeved upon the axle, the rib D will be forced against the wall E of the box by the tension of the flanges B and C, thereby maintaining a close joint. Warping of the plate under the tension of the flanges is prevented by the flanges J, and also by the rib D, so that the portion F will maintain its true plane and will permit the free rotation of the member G. Thus an effective dust seal is maintained.

While I have specifically shown and described the construction of dust guard in which there is a revoluble annulus it is obvious that the broader features of my invention are applicable to other types of guards.

I claim:

1. In a dust-guard, the combination with a member revolving with the axle, of a plate member having a dust-proof engagement with said revolving member, and comprising means for pressing said plate against the surrounding bearing, and means for stiffening the plate to prevent warping of the portion thereof engaging the member revolving with the axle.

2. In a dust-guard, the combination with a member revolving with the axle, of a plate member having a dust-proof engagement with said revolving member, said plate being embossed to form an annular rim surrounding the revolving member and preventing warping of the portion engaging the same, and comprising means for pressing said plate in contact with the surrounding bearing.

3. In a dust-guard, the combination of an obliquely split annulus, of U-shaped cross-section, having outwardly extending parallel flanges and forming a member engaging and revolving with the axle, of a plate member embossed to form an annular rim of greater diameter than said annulus and having an inwardly extending portion with a laterally extending flange fitting within the channel section, and resilient means for holding said annular rim against the adjacent bearing.

In testimony whereof I affix my signature.

DILLWYN M. BELL.

Copies of this patent may be obtained for five cents each, by addressing the "Commissioner of Patents, Washington, D. C."